(12) United States Patent
Lu et al.

(10) Patent No.: US 10,351,653 B2
(45) Date of Patent: *Jul. 16, 2019

(54) POLYURETHANE-POLYUREA DISPERSIONS COMPRISING HYDRAZINE OR HYDRAZIDE CHAIN EXTENDERS

(71) Applicant: 3M INNOVATIVE PROPERTIES COMPANY, St. Paul, MN (US)

(72) Inventors: Yongshang Lu, Woodbury, MN (US); Jon P. Nietfeld, Woodbury, MN (US); Susan M. Endle, New Richmond, WI (US); Richard G. Hansen, Mahtomedi, MN (US); Suresh Iyer, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/127,563

(22) PCT Filed: May 20, 2015

(86) PCT No.: PCT/US2015/031712
§ 371 (c)(1),
(2) Date: Sep. 20, 2016

(87) PCT Pub. No.: WO2015/183654
PCT Pub. Date: Dec. 3, 2015

(65) Prior Publication Data
US 2017/0174815 A1    Jun. 22, 2017

Related U.S. Application Data

(60) Provisional application No. 62/003,876, filed on May 28, 2014.

(51) Int. Cl.
| | |
|---|---|
| *C08G 18/08* | (2006.01) |
| *C08G 18/12* | (2006.01) |
| *C08G 18/24* | (2006.01) |
| *C08G 18/28* | (2006.01) |
| *C08G 18/32* | (2006.01) |
| *C08G 18/38* | (2006.01) |
| *C08G 18/42* | (2006.01) |

(Continued)

(52) U.S. Cl.
CPC ..... *C08G 18/0866* (2013.01); *C08G 18/0823* (2013.01); *C08G 18/12* (2013.01); *C08G 18/242* (2013.01); *C08G 18/246* (2013.01); *C08G 18/289* (2013.01); *C08G 18/3206* (2013.01); *C08G 18/3212* (2013.01); *C08G 18/3228* (2013.01); *C08G 18/3231* (2013.01); *C08G 18/3234* (2013.01); *C08G 18/3834* (2013.01); *C08G 18/3893* (2013.01); *C08G 18/4244* (2013.01); *C08G 18/4825* (2013.01); *C08G 18/6685* (2013.01); *C08G 18/74* (2013.01); *C08G 18/755* (2013.01); *C08G 18/758* (2013.01)

(58) Field of Classification Search
CPC ............... C08G 18/066; C08G 18/758; C08G 18/3893; C08G 18/4244; C08G 18/6685; C08G 18/242; C08G 18/3206; C08G 18/3212; C08G 18/3834; C08G 18/4825; C08G 18/755; C08G 18/0823; C08G 18/3228; C08G 18/12; C08G 18/246; C08G 18/289; C08G 18/3234; C08G 18/3231; C08G 18/74

See application file for complete search history.

(56) References Cited

U.S. PATENT DOCUMENTS

| | | | |
|---|---|---|---|
| 3,929,726 | A | 12/1975 | Schollenberger |
| 4,017,493 | A | 4/1977 | Ferment |

(Continued)

FOREIGN PATENT DOCUMENTS

| | | |
|---|---|---|
| EP | 2066712 | 6/2009 |
| JP | 2008-214617 | 9/2008 |

(Continued)

OTHER PUBLICATIONS

Dieterich, "Aqueous Emulsions, Dispersions and Solutions of Polyurethanes; Synthesis and Properties", Progress in Organic Coatings, 1981, vol. 9, pp. 281-340.

(Continued)

*Primary Examiner* — Rabon A Sergent
(74) *Attorney, Agent, or Firm* — Carolyn A. Fischer

(57) ABSTRACT

A method of making a silyl-terminated polyurethane in an aqueous dispersion aqueous silyl-terminated polyurethane dispersions are described. In one embodiment, the polyurethane comprises a) urethane moieties derived from the reaction of a (i) a diol; (ii) a neutralized anionic water solubilizing compound; and iii) a diisocyanate. The polyurethane also comprises b) silyl terminal groups derived from an alkoxy silane compound having the formula $(R^3O)_3SiR^4$—Z, wherein $R^3$ is independently hydrogen or a $C_1$-$C_4$ alkyl; $R^4$ is a divalent group selected from alkylene, alkylarylene, oxyalkylene; and Z is selected from the group consisting of —OH, —SH, —NR, —$NH_2$, wherein R is an aromatic or aliphatic cyclic group. The polyurethane also comprises c) urea moieties derived from the reaction of an isocyanate terminated prepolymer and a difunctional hydrazine or hydrazide compound.

11 Claims, No Drawings

(51) Int. Cl.
*C08G 18/48* (2006.01)
*C08G 18/66* (2006.01)
*C08G 18/74* (2006.01)
*C08G 18/75* (2006.01)

(56) References Cited

U.S. PATENT DOCUMENTS

| | | |
|---|---|---|
| 4,066,591 A | 1/1978 | Scriven |
| 4,147,679 A | 4/1979 | Scriven |
| 4,436,784 A | 3/1984 | Ehrhart |
| 4,447,571 A | 5/1984 | Dabi |
| 4,567,228 A | 1/1986 | Gaa |
| 4,582,873 A | 4/1986 | Gaa |
| 5,041,494 A | 8/1991 | Franke |
| 5,137,967 A | 8/1992 | Brown |
| 5,554,686 A | 9/1996 | Frisch, Jr. |
| 5,932,652 A | 8/1999 | Roesler |
| 6,046,295 A | 4/2000 | Frisch, Jr. |
| 6,172,126 B1 | 1/2001 | Muller |
| 6,313,335 B1 | 11/2001 | Roberts |
| 7,705,087 B2 | 4/2010 | Roesler |
| 2002/0146382 A1 | 10/2002 | Mallo |
| 2005/0159575 A1 | 7/2005 | Rische |
| 2009/0069497 A1 | 3/2009 | Roesler |

FOREIGN PATENT DOCUMENTS

| | | | |
|---|---|---|---|
| JP | 2008-214617 A | * | 9/2008 |
| WO | WO 2000-59975 | | 10/2000 |

OTHER PUBLICATIONS

International Search Report for PCT International Application No. PCT/US2015/031712 dated Sep. 1, 2015, 3 pages.

* cited by examiner

POLYURETHANE-POLYUREA DISPERSIONS COMPRISING HYDRAZINE OR HYDRAZIDE CHAIN EXTENDERS

CROSS REFERENCE TO RELATED APPLICATIONS

This application is a national stage filing under 35 U.S.C. 371 of PCT/US2015/031712, filed May 20, 2015, which claims the benefit of Provisional Application No. 62/003,876, filed May 28, 2014, the disclosure of which is incorporated by reference in its/their entirety herein.

SUMMARY

In one embodiment, a method of making a silyl-terminated polyurethane in an aqueous dispersion is described comprising the steps of (a) preparing an isocyanate terminated polyurethane prepolymer by reacting a mixture comprising: (i) a polyol component comprising a diol; and (ii) a polyisocyanate component comprising a diisocyanate. The method further comprises (b) reacting the isocyanate terminated polyurethane prepolymer prepared according to (a) sequentially with (iii) an anionic water solubilizing compound; (iv) a compound to neutralize the anionic water solubilizing compound; and (v) an alkoxy silane compound. The method further comprises (c) dispersing the resulting isocyanate terminated polyurethane prepolymer in water; and (d) reacting the isocyanate terminated polyurethane prepolymer with a difunctional chain extender comprising a hydrazide or hydrazine compound after (v) and either before or after (c).

In some favored embodiments, the polyurethane comprises no greater than 1 wt-% of ethylene oxide units. In typical embodiments, the method further comprises reacting the isocyanate terminated polyurethane with a polyol chain extender after iii) and prior to iv). Further, a chain extender comprising at least two amine groups is added to the aqueous polyurethane dispersion after c) and d).

In another embodiment, an aqueous silyl-terminated polyurethane dispersion is described. The polyurethane comprises a) urethane moieties derived from the reaction of a (i) a diol; (ii) a neutralized anionic water solubilizing compound; and iii) a diisocyanate. The polyurethane also comprises b) silyl terminal groups derived from an alkoxy silane compound having the formula $(R^3O)_3SiR^4$—Z, wherein $R^3$ is independently hydrogen or a $C_1$-$C_4$ alkyl; $R^4$ is a divalent group selected from alkylene, alkylarylene, oxyalkylene; and Z is selected from the group consisting of —OH, —SH, —NR, —NH$_2$, wherein R is an aromatic or aliphatic cyclic group. The polyurethane also comprises c) urea moieties derived from the reaction of an isocyanate terminated prepolymer and a difunctional hydrazine or hydrazide compound. In some embodiments, the polyurethane further comprises urea moieties derived from the reaction of an isocyanate terminated prepolymer and a diamine. In a favored embodiment, comprises no greater than 1 wt-% of ethylene oxide units.

In some embodiments, the silyl-terminated polyurethane exhibits improved thermal stability. In other embodiments, the polyurethane exhibits improved water resistance. In yet other embodiments, the polyurethane exhibits a combination of improved thermal stability and improved water resistance.

DETAILED DESCRIPTION

The polyurethanes described herein comprise several moieties including urethane moieties comprising polyisocyanate-derived moieties and polyol-derived moieties, neutralized anionic water solubilizing moieties, monovalent terminal silyl moieties, and polyurea moieties derived from difunctional hydrazine or hydrazide chain extenders, optional (e.g. polyol and/or amine) chain extender-derived moieties, as well as various optional moieties.

In general, the silyl-terminated polyurethane dispersions are prepared by first forming a polyurethane prepolymer. The polyurethane prepolymer is prepared from at a polyol component, at least one isocyanate reactive anionic water solubilizing component, at least one polyisocyanate component, and optionally polyol and/or polyamine chain extenders. This prepolymer is then neutralized, partially terminated with alkoxy silane, and chain extended with a difunctional hydrazide or hydrazine compound. The polyurethane is dispersed in water prior to or after being chain extended with the difunctional hydrazide or hydrazine compound. Following hydrolysis the alkoxy silane groups are converted to —Si—OH that are curable to form siloxane linkages —Si—O—Si—.

In a favored embodiment, the components of the polyurethane are selected such that the polyurethane has little or no ethylene oxide units. The polyurethane contains less than 1 or 0.5 wt-% of ethylene oxide moieties.

The polyurethane dispersions formed typically have a solids content ranging from about 3 to about 50 percent by weight solids. In some embodiments, the polyurethane dispersions are at least 5, 10, 15, or 20 percent by weight solids.

Although the polyurethane compositions are generally formed from difunctional components (e.g. diols, diisocyanates, hydrazine, dihydrazide, diamine etc.), multifunctional components with functionality greater than two may be incorporated into the polyurethane dispersion in limited amounts. When utilized such multifunctional components provide branching. As described in U.S. Pat. No. 6,046,295, incorporated herein by reference; the "urethane branching coefficient" (U.B.C.) is a calculation used to express total the amount of branching provided by multifunctional polyisocyanates, polyols and chain extenders in the urethane portion of the silane-terminated urethane dispersion, i.e., it excludes the siloxane linkages —Si—O—Si— and —Si—OH but will include other active hydrogen groups of the silane such as amine, mercaptan, etc. The calculation assumes unreacted isocyanate reacts with water. Using this measurement, the amount of branching in the silane-terminated polyurethane dispersions (the U.B.C.) typically ranges from about 1.7 to about 2.25, preferably from about 1.85 to about 2.01. In some embodiments, the U.B.C. is 2, meaning all such components are difunctional (e.g. diisocyantes(s), diols, etc.)

The polyol component comprises a compound having two isocyanate reactive functional groups (i.e. diols and derivatives thereof) and optionally further comprises a compound having greater than two isocyanate reactive groups (triols, tetrols, etc. and/or derivative thereof), each isocyanate reactive group having at least one active hydrogen.

Isocyanate-reactive components such as polyols (e.g. diols), thiols, and amines that may be reacted with diisocyanates to prepare the polyurethane prepolymers can be divided into two groups, i.e., high molecular weight compounds and low molecular weight compounds. High molecular weight compounds have a molecular weight of at least 400, 500, 600, 700, 800, or 1000 g/mole to about 10,000 g/mole. In some embodiments, the high molecular weight compounds have a molecular weight no greater than 9,000; 8,000; 7,000; 6,000; or 5,000 g/mole. The low molecular weight compounds (chain extenders) have a molecular weight below 400, 350, 300, or 250 g/mole. The molecular weights are number average molecular weights (Mn) and are determined by end group analysis (OH number). Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols and especially polyether polyols can be preferred.

Suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and may be substituted, e.g. by halogen atoms, and/or contain ethylenic unsaturation. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Polyesters of lactones may also be used. Illustrative fatty acid dimer diols are available from Croda, under the trade designation "Pripol 2033". Fatty acid dimer-based polyester polyols are available from Croda, under the trade designation "Priplast 1838".

In some embodiments, the polyurethane is prepared from an aliphatic polyester diol. Aliphatic polyester diol(s) can be the primary or sole high molecular weight diol of the polyurethane.

Suitable polyhydric alcohols that can be used in the preparation of polyester polyols and that can also useful as low molecular weight polyol chain extenders include, e.g. ethylene glycol; diethylene glycol; (1,2 or 1,3) propylene diol; (1,4 or 1,3) butane diol; (1,6) hexanediol; (1,8) octanediol; neopentyl glycol; (1,4) cyclohexanedimethanol; bis(2-hydroxyethyl) hydroquinone (HQEE); 2-methyl-1,3-propanediol; 2,2,4-trimethyl-1,3-pentanediol; triethylene glycol; tetraethylene glycol; polyethylene glycol; polypropylene glycol; dipropylene glycol; dibutylene glycol; polybutylene glycol, glycerine and trimethlyolpropane. Various mixtures of low molecular weight polyol chain extenders can be utilized.

In some embodiments, the polyurethane comprises cycloaliphatic chain extender moieties, and especially cyclohexane moieties. In other embodiments, the polyurethane comprises aliphatic $C_3$-$C_6$ alkylene diol chain extenders such as butane diol. When utilized, the concentration of polyol chain extender is typically at least 0.1, 0.2 or 0.3 wt-% and can range up 5, 6, 7, 8, 9, or 10 wt-% based on the total weight of the polyurethane.

Polycarbonates containing hydroxyl groups include those known per se such as the products obtained from the reaction of diols such as propanediol-(1,3), butanediol-(1,4) and/or hexanediol-(1,6), diethylene glycol, triethylene glycol or tetraethylene glycol with phosgene, diaryl-carbonates such as diphenylcarbonate or with cyclic carbonates such as ethylene or propylene carbonate. Also suitable are polyester carbonates obtained from the above-mentioned polyesters or polylactones with phosgene, diaryl carbonates or cyclic carbonates.

In some embodiments, the polyurethane is prepared from a polycarbonate diol. Polycarbonate diol(s) can be the primary or sole high molecular weight diol of the polyurethane.

Suitable polyether polyols are obtained in known manner by the reaction of starting compounds that contain reactive hydrogen atoms with alkylene oxides such as propylene oxide, butylene oxide, styrene oxide, tetrahydrofuran, epichlorohydrin or mixtures of these alkylene oxides. Suitable starting compounds containing reactive hydrogen atoms include the polyhydric alcohols set forth for preparing the polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris-(hydroxylphenyl)-ethane.

In some embodiments, the polyurethane is prepared from a propylene oxide and/or butylene oxide polyether diols. Propylene oxide and/or butylene oxide polyether diol(s) can be the primary or sole high molecular weight diol of the polyurethane.

In some embodiments, the high molecular weight diol(s) are utilized in an amount of at least 30, 35, 40, 45, or 50 wt-% based on the total weight of the polyurethane prior to hydrolysis. In some embodiments, the high molecular weight diols are generally utilized in an amount no greater than 80 or 75 wt-%. In some embodiments, the high molecular weight diol(s) are generally utilized in an amount no greater than 70 or 65 wt-%. Thus, the polyurethane comprises urethane moieties derived from high molecular weight diol moieties. The high molecular weight diol moieties are present in the hydrolyzed polyurethane in about the same ranges as just described.

In addition to the above-mentioned difunctional components (e.g. diols) small portions of trifunctional and higher functional components generally known in polyurethane chemistry, such as trimethylolpropane, may be utilized to obtain slight branching (as previously described). Although small concentrations of monofunctional end-capping isocyanate-reactive components, such as monols and monoamines can be utilized in small concentrations, it is typically preferred that little or no monofunctional components are utilized other than the monofunctional alkoxy silane compound. The polyurethane typically comprises 0 or no greater than 1 or 0.5 wt-% of monofunctional end-capping isocyanate-reactive components other than the alkoxy silane compound.

The polyisocyanate component comprises a compound having two isocyanate groups (i.e., diisocyanates and/or adducts thereof). The polyisocyanate component may optionally comprise compounds having greater than two isocyanate groups (e.g. triisocyanates and/or adducts thereof) to introduce branching, as previously described. Adducts of the polyisocyanate compounds as defined herein refer to isocyanate functional derivatives of polyisocyanate compounds and polyisocyanate prepolymers. Examples of adducts include but are not limited to those selected from the group consisting of ureas, biurets, allophanates, dimers and trimers of isocyanate compounds, uretonimediones, and mixtures thereof. Any suitable organic polyisocyanate, such as an aliphatic, cycloaliphatic, araliphatic or aromatic polyisocyanate, may be used either singly or in mixtures of two or more.

Aromatic polyisocyanates can be more economical and reactive toward polyols and other poly(active hydrogen)

compounds than aliphatic polyisocyanates. Suitable aromatic polyisocyanates include but are not limited to those selected from the group consisting of 2,4-toluene diisocyanate, 2,6-toluene diisocyanate, a dimer of toluene diisocyanate (available under the trademark Desmodur™ TT from Bayer), diphenylmethane 4,4'-diisocyanate (MDI), 1,5-diisocyanato-naphthalene, 1,4-phenylene diisocyanate, 1,3-phenylene diisocyanate, and mixtures thereof.

Aliphatic isocyanates can provide better light stability than the aromatic compounds. Examples of useful cycloaliphatic polyisocyanates include but are not limited to those selected from the group consisting of dicyclohexylmethane diisocyanate ($H_{12}$ MDI, commercially available as Desmodur™ W from Bayer), isophorone diisocyanate (IPDI), 1,4-cyclohexane diisocyanate (CHDI), 1,4-cyclohexanebis (methylene isocyanate) (BDI), 1,3-bis(isocyanatomethyl) cyclohexane ($H_6$ XDI), and mixtures thereof. Examples of useful linear or branched aliphatic polyisocyanates include but are not limited to those selected from the group consisting of hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethyl diisocyanate, and mixtures thereof.

In some embodiments the diisocyanate component comprises cyclic aliphatic moieties, such as dicyclohexylmethane moieties, as can be derived from dicyclohexylmethane 4,4'-diisocyanate (H12MDI), and derivatives thereof. Other cyclic aliphatic moieties include alkyl cyclohexy, as can be derived from IPDI. Mixtures of cycloaliphatic moieties can be present.

In some embodiments, cyclic aliphatic diisocyananate(s) are generally utilized in an amount of at least 15, 20 or 25 wt-% and typically no greater than 50, 45, 40, or 35 wt-% based on the total weight of the polyurethane, prior to hydrolysis. Thus, the polyurethane comprises urethane moieties derived from cyclic aliphatic diisocyananante(s). Cyclic aliphatic (e.g. diisocyananante) moieties are present in the hydrolyzed polyurethane in about the same ranges as just described.

The polyurethane prepolymer can be characterized as an isocyanate terminated polyurethane prepolymer. The isocyanate groups of the isocyanate terminated polyurethane prepolymer are utilized in subsequent reactions.

The polyurethane prepolymer is prepared with excess isocyanate, i.e. containing more than one isocyanate radical in the reaction mixture for each active hydrogen radical contributed by the isocyanate-reactive components, e.g. polyol components, the anionic water solubilizing compound, alkoxy silane compound, and other isocyanate reactive compounds in the prepolymer. "Active hydrogens" are those nucleophilic hydrogen atoms which conform to the Zerewitinoff determination of hydrogen atoms; i.e., compounds which, when reacted with a solution of methylmagnesium iodide in purified n-butyl ether, produce methane. Isocyanate reactive groups having at least one active hydrogen include hydroxyl, —OH; thiol, —SH; and amines, —$NH_2$, and —NHR, wherein R is selected from the group consisting of phenyl, straight or branched aliphatic groups comprising from about 1 to about 12 carbon atoms, and cycloaliphatic groups.

The isocyanate equivalent to active hydrogen equivalent ratios is >1:1 (e.g. 1.05:1) to about 4:1 are suitable in the polyurethane prepolymers. In some embodiments, the ratio is no greater than 3:1 or 2:1. This ratio is the highest after reacting the polyol component with the isocyanate component and declines with the subsequent addition of isocyanate reactive components.

The isocyanate terminated polyurethane prepolymer is reacted with an anionic water solubilizing compound. The water solubilizing compound comprises at least one anionic water solubilizing group and at least one isocyanate reactive functional group. Preferably, each water solubilizing compound has two isocyanate reactive (e.g. —OH) groups. Suitable anionic water-solubilizing groups include carboxyl, sulfate, sulfonate, phosphate, phosphonate and the like, which ionize in water when combined with a corresponding neutralization (e.g. salt-forming) compound.

A suitable anionic water-solubilizing compound is represented by the formula $(HB)_2R^1A$; wherein A is an anionic water-solubilizing moiety; B is O, S, NH or NR wherein R is an alkyl group comprising 1 to 4 carbon atoms; and $R^1$ represents an organic linking group having a valency of at least 3, typically comprising about 2 to about 25 carbon atoms. A is typically an anionic water solubilizing group such as —$CO_2$ M, —$OSO_3$ M, —$SO_3$ M, —$OPO(OM)_2$, —$PO(OM)_2$, wherein M is H or a cation such as sodium, potassium, and calcium. Illustrative anionic water solubilizing compounds include dihydroxycarboxylic acids, dihydroxysulphonic acids, dihydroxyphosphonic acids and salts thereof such as dimethylolpropionic acid (DMPA) depicted as follows:

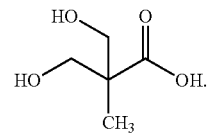

The amount of anionic water-solubilizing group is sufficient to emulsify the polyurethane polymer in water. The weight ratio of isocyanate to anionic water solubilizing group is typically at least 3:1, 4:1, 5:1 or 6:1 and typically no greater than 15:1 or 10:1. In some embodiments, anionic water-solubilizing compound(s) are utilized in an amount of at least 1, 1.5, 2, or 2.5 wt-% and typically no greater than about 5 wt-% based on the total weight of the polyurethane prior to hydrolysis. Thus, the polyurethane comprises urethane moieties derived from anionic water-solubilizing compound(s). The anionic water-solubilizing moieties are present in the hydrolyzed polyurethane in about the same ranges as just described.

In typical embodiments, the anionic groups of the anionic water solubilizing compound are neutralized prior to reacting the isocyanate terminated polyurethane prepolymer with isocyanate-reactive silane compounds. A sufficient amount of a neutralizing compound is used to anionically stabilize the dispersions such as through the formation of salts with the pendant (e.g. carboxylate) water-solubilizing groups on the resultant polyurethane. Examples of useful salt-forming compounds include but are not limited to ammonia, trimethylamine, triethylamine, tripropylamine, triisopropylamine, tributylamine, triethanolamine, diethanolamine, and mixtures thereof.

A portion of the isocyanate groups of the isocyanate terminated polyurethane prepolymer are reacted with an isocyanate-reactive silane compounds. Silane compounds containing one, two, or three hydrolyzable groups on the silicon and one organic group including an isocyanate-reactive group. An alkoxy group is the most typical hydrolyzable group.

The alkoxy silane compound generally has the formula $(R^3O)_3SiR^4-Z$, wherein $R^3$ is independently hydrogen or a $C_1$-$C_4$ alkyl (e.g., methoxy, ethoxy); $R^4$ is a divalent group selected from alkylene, alkylarylene (e.g. alkylphenyl), and oxyalkylene; and Z is selected from the group consisting of —OH, —SH, —NHR, —NH$_2$, wherein R is an aromatic or aliphatic cyclic group. When $R^4$ is alkylene or oxyalklyene, the group may be linear, branched, or cyclic. The alkylene or oxyalklyene group typically has 1 to 12 carbon atoms and in some embodiments 2-3 carbon atoms.

Examples of suitable aminoalkylene alkoxysilanes include 2-aminoethyl-dimethylmethoxysilane; 6-amino-hexyl-tributoxysilane; 3-aminopropyl-trimethoxysilane; 3-aminopropyl-triethoxysilane; 3-aminopropyl-methyidi-ethoxysilane; 5-aminopentyl-trimethoxysilane; 5-amino-pentyl-triethoxysilane and 3-aminopropyl-triisopropoxysi-lane. Examples of other isocyanate-reactive alkoxy silanes include hydroxylmethyltriethoxysilane and 3-mercapto pro-pyltriethoxysilane.

In some embodiments, alkoxy silane compound(s) are utilized in an amount of at least 0.1, 0.2, 0.3, 0.4, or 0.5 wt-% ranging up to 7, 8, 9, or 10 wt-% based on the total weight of the polyurethane prior to hydrolysis. Thus, the polyurethane comprises urethane moieties derived from alkoxy silane compound(s). The alkoxy silane moieties are present in the polyurethane in the same ranges as just described prior to hydrolysis and slightly less after hydrolysis due to the conversion of the alkoxy group to —OH. The silicon atom concentration generally ranges from 0.015 to 1.5 wt-% of the polyurethane.

A portion of the isocyanate groups of the isocyanate terminated polyurethane prepolymer are chain extended with a difunctional hydrazine or hydrazide compound. Difunctional hydrazine compounds include anhydrous hydrazine has the formula H$_2$N—NH$_2$, as well as hydrazine hydrate that is typically 50-60% hydrazine.

Dihydrazides include for example carbodihydrazide (CDH) and thiocarbohydrazide,
depicted as follows:

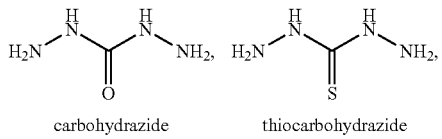 [SMILES: NNC(=O)NN ; NNC(=S)NN]

carbohydrazide      thiocarbohydrazide as well as dihydrazides having the following formula:

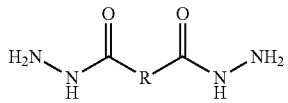

where R is a covalent bond (such as in the case of oxalic dihydrazide), a heteroatom such as nitrogen (such as in the case of imidodicarboxylic acid dihydrazide) or a polyvalent (e.g. divalent) organic radical, such as (e.g. $C_1$-$C_{18}$) alkylene, optionally comprising contiguous heteroatoms such as oxygen or nitrogen; arylene (e.g. phenyl) typically having a molecular weight no greater than 500, 400, or 300 g/mole. Some illustrative dihydrazides are depicted as follows:

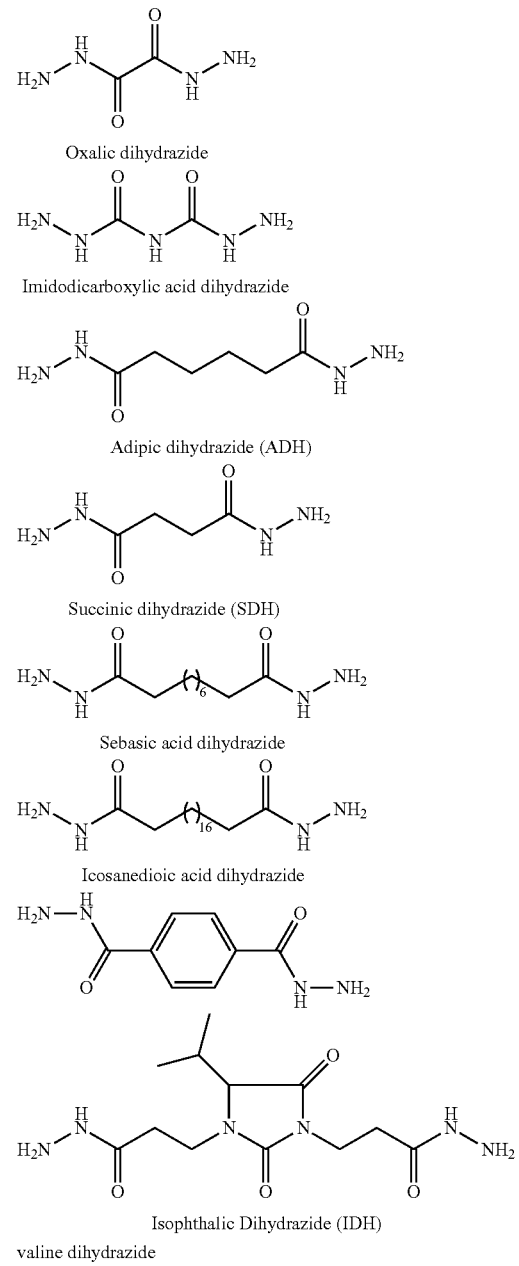

Oxalic dihydrazide

Imidodicarboxylic acid dihydrazide

Adipic dihydrazide (ADH)

Succinic dihydrazide (SDH)

Sebasic acid dihydrazide

Icosanedioic acid dihydrazide

Isophthalic Dihydrazide (IDH)

valine dihydrazide

In some embodiments, hydrazine and/or dihydrazide compound(s) are utilized in an amount of at least 0.1, 0.2, 0.3, 0.4, or 0.5 wt-% ranging up to 5, 6, 7, 8, 9, or 10 wt-% based on the total weight of the polyurethane prior to hydrolysis. Thus, the polyurethane comprises urea moieties derived from hydrazine and/or dihydrazide compound(s). The hydrazine and/or dihydrazide moieties are present in the hydrolyzed polyurethane is about the same ranges as just described.

In some embodiments, a portion of the isocyanate groups of the isocyanate terminated polyurethane prepolymer are chain extended with a multifunctional (e.g. difunctional) amine chain extender. Examples of useful diamine chain extenders include but are not limited to those selected from the group consisting of 4,4'-methylene bis(o-chloroaniline) (MOCA or MBOCA), 2,5-diethyl-2,4-toluene diamine (DETDA), 4,4'-methylene bis(3-chloro-2,6-diethylaniline) (MCDEA), propylene glycol bis(4,4'-aminobenzoate), 3,5-di(thiomethyl)-2,4-toluene diamine, methylene bis(4,4'-aniline)(MDA), ethyl-1,2-di(2-amino thiophenol), 4-chloro-3,5-diamino isobutylbenzoate, 1,2-diaminoethane, 1,4-diaminobutane, 1,6-diaminohexane, N, N'-dialkyl (methylene dianiline), N, N'-dialkyl(1,4-diaminobenzene), and mixtures thereof.

In some embodiments, multifunctional amines, and especially diamine(s) chain extenders are utilized in an amount of at least 0.1, 0.2, 0.3, 0.4 or 0.5 wt-% ranging up to 5, 6, 7, 8, 9, or 10 wt-% based on the total weight of the polyurethane prior to hydrolysis. In some embodiments, multifunctional amines (e.g. diamines) are utilized in an amount of at least 1.0, 1.5, or 2 wt-%. Thus, the polyurethane comprises urea moieties derived from multifunctional amines (e.g. diamine). The multifunctional amines (e.g. diamine) moieties are present in the hydrolyzed polyurethane is about the same ranges as just described.

The polyurethane prepolymer compositions are typically prepared with a catalyst as known in the art. The amount of catalyst can range up to about 0.5 parts by weight of the isocyanate-terminated prepolymer. In some embodiments, the amount of catalyst ranges from about 0.005 to about 0.05 part by weight. Examples of useful catalysts include but are not limited to those selected from the group consisting of tin II and IV salts such as stannous octoate and dibutyltin dilaurate, and dibutyltin diacetate; tertiary amine compounds such as triethyl amine and bis(dimethylaminoethyl) ether, morpholine compounds such as .beta.,.beta.'-dimorpholinodiethyl ether, bismuth carboxylates, zinc-bismuth carboxylates, iron (III) chloride, potassium octoate, and potassium acetate.

Solvents can be utilized to control the viscosity of the isocyanate-terminated prepolymer. Examples of useful solvents (which are typically volatile organic compounds) added for this purpose include but are not limited ketones (e.g. methyl ethyl ketone, acetone), tertiary alcohols, ethers, esters, amides, hydrocarbons, chlorohydrocarbons, chlorocarbons, and mixtures thereof. Such solvent are usually stripped at the end of the reaction by vacuum heating. Under laboratory conditions, a Haake Rotoevaporator or other similar equipment can be used to remove the solvent.

Solvents can also be utilized to promote the coalescence of the silyl-terminated polyurethane particles of the dispersion to form a continuous film. Examples of such coalescing solvents for use in the dispersion include but are not limited to those selected from the group consisting of n-methyl pyrrolidinone (NMP), n-butyl acetate, dimethyl formamide, toluene, methoxypropanol acetate (PM acetate), dimethyl sulfoxide (DMSO), ketones, alcohols, dimethyl acetamide, and mixtures thereof.

An isocyanate terminated polyurethane prepolymer is prepared in a sequential step process. To a reactor equipped with a stirrer, a heater, and a dry gas purge (for example, nitrogen, argon, etc.), the (e.g. high molecular weight) polyol and polyisocyanate component are added to the reactor with optional catalyst and optional solvent (e.g. anhydrous methylethyl ketone, having $H_2O$ levels of 0.05% or less). The reactor is heated to the reaction temperature (generally greater than 75° C. to about 100° C.) and the reaction is allowed to proceed for a period of time. This period of time is from 15 minutes to 8 hours, preferably from 30 minutes to 4 hours. Next the isocyanate reactive anionic water solubilizing component (e.g. dimethylolpropionic acid) is added with optional solvent and the reaction is allowed to proceed for a period of time. This period of time is from 15 minutes to 8 hours, preferably from 1 hour to 6 hours, keeping the reaction exotherm below 100° C. to minimize unwanted side reactions. Optionally all or a portion of the (e.g. polyol) chain extender component can be added at this point with optional solvent and the reaction is allowed to proceed for a period of time. This period of time is from 15 minutes to 8 hours, preferably from 1 hour to 4 hours. The viscosity of the prepolymer is typically low enough (about 70,000 cps or less) to facilitate the dispersion step.

The next step is to combine the isocyanate-terminated prepolymer with a neutralizing compound (e.g. triethylamine) followed by reacting a portion of the isocyanate groups of the prepolymer with the isocyanate-reactive alkoxy silane compound. At least a portion of the remaining isocyanate groups of the prepolymer are chain extended with the difunctional hydrazine or hydrazide compound. The reaction of the prepolymer with the hydrazine or hydrazide compound can occur before or after the polyurethane is dispersed in water. Optionally, a chain extender, such as an alkylene diamine can be added to react with a portion of the remaining isocyanate groups. In one embodiment, the hydrazine/hydrazide compound is reacted before the prepolymer is dispersed in water and the optional second alkylene diamine is added after the dispersion is formed.

Following hydrolysis, the alkoxy silane group are converted to Si—OH groups that are curable to form siloxane linkages, —Si—O—Si—, as known in the art.

The alkoxy silane containing polyurethane prepolymer can be dispersed in water in a number of ways. The polymer or prepolymer, whether neat or a solution, preferably is added incrementally to most or a substantial portion of the aqueous dispersing medium with agitation. Alternatively, the aqueous dispersing medium can be added incrementally to the prepolymer with stirring. However, this latter method is less preferred because commonly upon initial addition of the dispersing medium, a high viscosity, grease-like material results. The main disadvantage associated with the grease-like viscosity is that it is very hard to stir in the chain extenders. In the absence of efficient stirring, the possibility increases of forming an unstable emulsion system because of large particle size agglomerates. By adding the prepolymer to water, this high initial viscosity is avoided. As noted in U.S. Pat. Nos. 4,147,679 and 4,066,591, additional solvent can be added to the isocyanate-containing prepolymer or even to the polymer before or after addition of the prepolymer, where the solvent is added to the aqueous medium. In referring to the aqueous dispersing medium, it is intended to include water plus water having solvent and possibly neutralizing agents. If the water is added to the prepolymer, any method known to those skilled in the art in producing polyurethane aqueous dispersions can be used to reduce the possibility of increasing the formation of large particle size agglomerates.

One or more additives may be added to the dispersion of the invention including but not limited to those selected from the group consisting of crosslinking agents, plasticizers, thixotropic agents, biocides, adhesion promoters such as silane adhesion promoters, corrosion inhibitors, pigments, colorants, photostabilizers, antioxidants, and anti-fouling agents. Various polyurethane dispersion additives are known in the art.

The silyl-terminated polyurethane polymer typically has a molecular weight (Mn) of at least 10,000; 15,000; or 20,000 g/mole. The silyl-terminated polyurethane polymer typically has a molecular weight (Mn) of no greater than about 250,000 g/mole. In some embodiments, the polyurethane polymer has a molecular weight (Mn) no greater than 200,000; 175,000; 150,000; 125,000, or 100,000 g/mole.

In some embodiments, the silyl-terminated polyurethane polymers described herein exhibit a thermal discoloration (after 12 or 16 days as determined by the test method described in the examples), ΔE value of <5 and more desirably <2. In some embodiments, the thermal discoloration ΔE is less than 1.5 or 1. In other embodiments, the silyl-terminated polyurethane polymers described herein have a water resistance (as determined by the test method described in the examples), ΔE value of <10 and more desirably <5. In some embodiments, the water resistance ΔE is less than 4, 3, 2, or 1. It is most desirable for the polymers of the present invention to have thermal discoloration ΔE values <2 and to have water resistance as measured by ΔE values <5.

The dispersions of the invention can be coated on a variety of substrates to form high gloss, water and solvent resistant, tough, scratch resistant, preferably thermal and light stable (non-yellowing) films.

Substrates such as leather, woven and nonwoven webs, glass, glass fibers, wood (including oil woods such as teak, etc.), metals (such as aluminum), treated metal such as primed and painted metals (such as those comprising automobile and marine surfaces), polymeric materials and surfaces, such as plastics (appliance cabinets, for example) etc., can be coated with the dispersions or films.

The composition of the invention has utility as an intermediate coating. It is generally applied over the several primer and sealer layers (well known to those skilled in the art) used to coat metal (including primed metal and painted metal), plastic, and fiber-reinforced plastic composite substrates used in the fabrication of vehicular bodyparts and appliance cabinets. Vehicular bodyparts include, for example, hoods, fenders, bumpers, grills, rocker panels and the like; and appliance cabinets include, for example, washers, clothes dryers, refrigerators, and the like. Examples of vehicles on which the compositions can be used include automobiles, trucks, bicycles, airplanes, watercraft, etc. The composition of the invention can be used as an intermediate coating because it is applied under top/finish coatings which typically comprise paints, enamels, and lacquers and the like that in many cases are chemically crosslinked to provide durable, scratch-resistant surface finishes. The composition of the invention adheres to most body filler compositions and thus also has utility in the autobody repair trade.

The composition of the invention can also be coated onto composite materials, such as fiber reinforced plastics wherein the plastics are toughened by the addition of glass, boron, graphite, ceramic, or dissimilar polymer fibers; and filled plastics wherein the plastic properties are modified by the addition of inorganic powders, (such as calcium carbonate, talc, titanium dioxide, carbon black, etc.), flakes (such as aluminum, mica, etc.), and microspheres/beads (such as glass or polymeric). The composition of the invention can be coated onto a number of articles such as vehicular body parts and appliance cabinets.

The compositions of the invention may also be coated on surfaces such as concrete, asphalt, etc. (roadways, patios, sidewalks, etc.). An adhesive backed pavement marking tape may be adhered thereto.

EXAMPLES

Materials

| Chemical | Description | Source |
|---|---|---|
| "H12MDI", bis(4-isocyanatocyclohexyl) methane) | Diisocyanate | Bayer Corporation, Pittsburgh, PA under trade designation "DESMODUR W" |
| "IPDI", 3-isocyanatomethyl-3, 5,5-trimethylcylcohexyl isocyanate (IDPI) | Diisocyanate | Bayer Corporation, Pittsburgh, PA under trade designation "DESMODUR I" |
| "VORANOL" | Polyether polyol, neutralized propylene oxide polyol Mw = 2000 | Dow Chemical Company, Midland, MI, under trade designation "VORANOL 220-056N" |
| "VORANOL 220-094" | Polyether polyol, Mw = 1200 | Dow Chemical Company, Midland, MI, under trade designation "VORANOL 220-094" |
| "C3090" | Carbonate diol, Mw = 3000 3-methyl-1,5 pentane diol/hexane diol at 9/1 | Kuraray Co., Ltd., Tokyo, Japan under trade designation "KURARAY POLYOL C-3090" |
| "1,4-BDO" | 1,4-butanediol, chain extender | Alfa Aesar, Ward Hill, MA |
| "CHDM" | Cyclohexanedimethanol, chain extender | Eastman Chemical Company, Kingsport, TN |
| "S107-55" | Polyester polyol Poly[oxy(2,2-dimethyl-1,3-propanediyl)oxy(1,6-dioxo-1,6-hexanediyl)] | Bayer Corporation, Pittsburgh, PA under trade designation "DESMOPHEN S107-55" |
| "DMPA" | Dimethylolpropionic acid, anionic water solubilizing compound | TCI, Tokyo, JP |
| "TEA" | Triethylamine, neutralizer | EMD Chemicals, Gibbstown, NJ |
| "DBTDL" | Dibutyltin dilaurate, catalyst | Sigma-Aldrich, St. Louis, MO. |
| "AMEO" | Aminopropyltriethoxysilane | Evonik Industries AG, Mobile Alabama under trade designation "DYNASYLAN AMEO" |

-continued

| Chemical | Description | Source |
| --- | --- | --- |
| "ED" | Ethylene diamine, chain extender | Alfa-Aesar, Ward Hill, MA. |
| "HH" | Hydrazine monohydrate, chain extender | Alfa Aesar, Ward Hill, MA |
| "CDH" | Carbohydrazide, chain extender | Sigma-Aldrich, St. Louis, MO. |
| "oxalic dihydrizide" | dihydrazide, chain extender | Sigma-Aldrich, St. Louis, MO. |
| "succinic dihydrizide" | dihydrazide, chain extender | Sigma-Aldrich, St. Louis, MO. |
| "adipic dihydrizide" | dihydrazide, chain extender | Sigma-Aldrich, St. Louis, MO. |
| "IRGANOX 1010" | Anti-oxidant | BASF, Vandalia, IL under trade designation "IRGANOX 1010" |
| "TINUVIN 292" | Light stabilizer | BASF, Vandalia, IL "TINUVIN 292" |
| "MEK" | Methyl ethyl ketone, solvent | Avantor Performance Materials, Inc Center Valley, PA |
| "Acetone" | Solvent | EMD Chemicals, Gibbstown, NJ |
| "ethyl acetate" | solvent | Honeywell, Burdick & Jackson, Muskegon, MI |
| "Irganox 245" | Anti-oxidant | BASF, Vandalia, IL under trade designation "IRGANOX 245" |
| "M-PEG" | Methoxy polyethylene glycol, Mw = 2000 | Sigma-Aldrich, St. Louis, MO. |

Test Methods
Method for Measuring Discoloration (Yellowing)

The polyurethane dispersions (PUD) prepared according to the Examples and Comparative Examples described below with a solid content of about 35 wt. % were coated on white automotive painted panels coated with a 10 mil (250 micrometer) wet drawdown and dried at room temperature for 24 h. Then the films on the white panels were aged up to 10 days in a 180° F. (82° C.) oven. The thermal aging color was measured by determining ($\Delta E$) using a X-Rite MA68II multi-angle spectrophotometer (X-Rite, Inc., Regensdorf, Switzerland) at 45 degree angle with a D65 10 light source. Two sample readings are averaged. The difference in color was calculated using the $\Delta E$ equation listed below. Color change caused by thermal degradation is indicated by increasing $\Delta E$ values.

$$\Delta E = [(\Delta L^*)2 + (\Delta a^*)2 + (\Delta b^*)2]1/2$$

Where
$\Delta L^* = L^*1 - L^*2$ is the lightness difference
$\Delta a^* = a^*1 - a^*2$ is the red (positive) or green (negative) value
$\Delta b^* = b^*1 - b^*2$ is the yellow (positive) or blue (negative) value Method for Determining Water Resistance The PUD dispersions were prepared according to the examples and comparative examples described below with a solid content of approximately 35% solids. Films from these dispersions were cast onto 2-stage black automotive painted panels using a 10 mil (250 micrometer) notched drawdown bar. The wet coatings were dried in a controlled temperature and humidity room set at 72° F. and 50% humidity. The coatings were dry to touch in 1-1.5 hours and further left in the controlled temperature-humidity room for a total dry/cure time of 24 hours. After 24 hours, the color of the coatings was recorded using a X-Rite MA 68II multi-angle spectrophotometer and the panels were submerged in distilled water for 18 hours. Following 18 hours under water, the coatings were removed and the color was re-measured immediately to determine the film's color change ($\Delta E$). The difference in color was calculated using the $\Delta E$ equation listed below. As the $\Delta E$ increases the water resistance is said to decrease due to the film changing color.

$$\Delta E = [(\Delta L^*)2 + (\Delta a^*)2 + (\Delta b^*)2]1/2$$

Where
$\Delta L^* = L^*1 - L^*2$ is the lightness difference
$\Delta a^* = a^*1 - a^*2$ is the red (positive) or green (negative) value
$\Delta b^* = b^*1 - b^*2$ is the yellow (positive) or blue (negative) value These values were measured using CIEL*a*b* color equation at a 45° angle and a D65/10 light source Control Example 1 (C-1)—No Hydrazine or Hydrazide Chain Extender The silane-terminated polyurethane dispersion was prepared as follows. A 500 mL four-necked round bottom flask equipped with a mechanical stirrer, thermometer, condenser and nitrogen inlet was charged with 63.64 VORANOL and 32.35 g H12MDI. The polyaddition reaction was carried out under stirring at 78° C. in the presence of DBTDL of about 0.02 g. After 1 h reaction, 4.0 g DMPA and 20 gram MEK was added. Then the reaction was carried out at 85° C. for about 3 h until DMPA was dissolved to form a homogenous solution. The NCO content of the prepolymers was determined by standard dibutylamine back titration method. Upon obtaining the theoretical NCO value, the chains were extended by adding CHDM of 4.39 g, and allowed to react for 2.0 h to form polyurethanes prepolymer, which was then cool to about 40° C. and diluted by adding 60 g acetone. The resulting prepolymers were then neutralized by the addition of TEA (3.02 g) under stirring for 30 min, and then partially terminated by the addition of 1.21 g AMEO for another 20 min. Aqueous dispersions were accomplished by slowly adding 200 g cold de-ionized (DI) water of 5-10° C. to silane-terminated polyurethane prepolymer with vigorous stirring. Once the prepolymer was dispersed, the ED of 1.39 g in 4.0 g water was slowly added for further chain extension under the stirring for about 1 h. Then MEK/acetone was removed at 40° C. on a rotary evaporator, resulting in a silane-terminated polyurethane dispersion with a solid content of 35% by weight.

Control Example 2 (C-2) Polyurethane Comprising Ethylene Oxide Units

To a 500 mL reaction vessel with stirring, cooling and heating system, 32.35 g H12MDI, 63.64 g VORANOL, 4.0 g DMPA, 20.0 g MEK, 3.96 g CHDM and 5.0 g M-PEG were added and heated up to 70° C. for 4 h until the theoretical isocyanate content was reached. The isocyanate-functional polyurethane prepolymer was then cool down to room temperature and diluted with 60 g of acetone, followed by adding 3.02 g TEA under stirring. Then the isocyanate terminated polyurethane prepolymer was dispersed by adding 150 g of DI water in 10 minutes, followed by adding 0.56 g of HH and 0.67 g ED rapidly. After about 15 minutes for chain extension, 3.35 g AMEO was added followed by 66 g DI water. The resulting dispersion was stirred at 50° C. until isocyanate groups were no longer detectable by IR spectroscopy. A finely divided polyurethane dispersion was obtained with a solid content of 35% by weight and 4.29 wt-% ethylene oxide moieties.

Example 3 (EX-3)

A 500 mL four-necked round bottom flask equipped with a mechanical stirrer, thermometer, condenser and nitrogen inlet was charged with 63.64 VORANOL and 32.35 g H12MDI. The polyaddition reaction was carried out under stirring at 78° C. in the presence of DBTDL of about 0.02 g. After 1 h reaction, 4.0 g DMPA and 20 g MEK was added. Then the reaction was carried out at 85° C. for about 3 h until DMPA was dissolved to form a homogenous solution. The NCO content of the prepolymers was determined by standard dibutylamine back titration method. Upon obtaining the theoretical NCO value, the chains were extended by adding CHDM of 4.39 g, and allowed to react for 2.0 h to form polyurethanes prepolymer, which was then cooled to about 40° C. and diluted by adding 60 g acetone. The resulting prepolymers were then neutralized by the addition of TEA (3.02 g) under stirring for 30 min, and then partially terminated by the addition of 1.21 g AMEO for another 20 min, followed by adding 0.5 g IRGANOX 1010 as an antioxidant and 0.5 TINUVIN 292 as a light stabilizer. Then a chain extender of CDH of 1.52 g in 6.0 g water was added into the polyurathane prepolymer. After 5 minutes later, aqueous dispersion was accomplished by slowly adding 195 g cold DI water of 5-10° C. to silane-terminated polyurethane prepolymer with vigorous stirring. Once the prepolymer was dispersed, the ED of 0.34 g in 5.0 g water was slowly added for further chain extension under the stirring for about 1 h. Then MEK/acetone was removed at 40° C. on a rotary evaporator, resulting in a silane-terminated polyurethane dispersion with a solid content of 35% by weight.

Example 4 (EX-4)

EX-4 was prepared in the same manner as EX-3, except that the amounts of the components were varied as summarized in Table 1, below.

Example 5 (EX-5)

EX-5 was prepared in the same manner as EX-3, except that no IRGANOX 1010 or TINUVIN 292 was added and the amounts of the components used was varied as summarized in Table 1, below.

Example 6 (EX-6)

EX-6 was prepared in the same manner as EX-5, except that no ED was added and the amounts of the components used was varied as summarized in Table 1, below.

Examples 7 & 8 (EX-7 and EX-8)

EX-7 and EX-8 were prepared in the same manner as EX-5, except that the amount and the type of chain extender was varied as summarized in Table 1, below.

Example 9 (EX-9)

A 500 mL four-necked round bottom flask equipped with a mechanical stirrer, thermometer, condenser and nitrogen inlet was charged with 77.97 g C-3090 and 18.52 g H12MDI. The polyaddition reaction was carried out under stirring at 78° C. in the presence of DBTDL of about 0.02 g. After 1 h reaction, 3.5 g DMPA and 20 g MEK was added. Then the reaction was carried out at 85° C. for about 3 h until DMPA was dissolved to form a homogenous solution. The NCO content of the prepolymers was determined by standard dibutylamine back titration method. Upon obtaining the theoretical NCO value, the chains were extended by adding 1,4-BDO of 0.4 g, and allowed to react for 2.0 h to form polyurethane prepolymer, which was then cooled to about 40° C. and diluted by adding 60 g acetone. The resulting prepolymers were then neutralized by the addition of TEA (2.64 g) under stirring for 30 min, and then partially terminated by the addition of 3.32 g AMEO for another 20 min, followed by adding 0.5 g IRGANOX 1010 as an antioxidant and 0.5 TINUVIN 292 as a light stabilizer. Then a chain extender of CDH of 0.68 g in 7.0 g water was added into the polyurethane prepolymer. After 5 minutes later, aqueous dispersion was accomplished by slowly adding 190 g cold DI water of 5-10° C. to silane-terminated polyurethane prepolymer with vigorous stirring. Once the prepolymer was dispersed, the ED of 0.45 g in 5.0 g water was slowly added for further chain extension under the stirring for about 1 h. Then MEK/acetone was removed at 40° C. on a rotary evaporator, resulting in a silane-terminated polyurethane dispersion with a solid content of 35% by weight.

Example 10 (EX-10)

A 500 mL four-necked round bottom flask equipped with a mechanical stirrer, thermometer, condenser and nitrogen inlet was charged with 63.64 g S107-55 and 32.35 g H12MDI. The polyaddition reaction was carried out under stirring at 78° C. in the presence of DBTDL of about 0.02 g. After 1 h reaction, 4.0 g DMPA and 20 g MEK was added. Then the reaction was carried out at 85° C. for about 3 h until DMPA was dissolved to form a homogenous solution. The NCO content of the prepolymers was determined by standard dibutylamine back titration method. Upon obtaining the theoretical NCO value, the chains were extended by adding CHDM of 3.96 g, and allowed to react for 2.0 h to form polyurethanes prepolymer, which was then cool to about 40° C. and diluted by adding 60 g acetone. The resulting prepolymers were then neutralized by the addition of TEA (3.02 g) under stirring for 30 min, and then partially terminated by the addition 1.21 g AMEO for another 20 min. Then a chain extender of CDH of 0.56 g in 5.0 g water was added into the polyurethane prepolymer. After 5 minutes later, aqueous dispersion was accomplished by slowly adding 195 g cool water of 5-10° C. to silane-terminated polyurethane prepolymer with vigorous stirring. Once the prepolymer was dispersed, the ethylene diamine of 0.68 g in 6.0 g water was slowly added for further chain extension under the stirring for about 1 h. Then MEK/acetone was removed at 40° C. on a rotary evaporator, resulting in a silane-terminated polyurethane dispersion with a solid content of 35% by weight.

TABLE 1

| Component (grams) | EX-3 | EX-4 | EX-5 | EX-6 | EX-7 | EX-8 |
|---|---|---|---|---|---|---|
| H12MDI | 32.35 | 29.46 | 32.35 | 32.35 | 32.35 | 32.35 |
| IPDI | | | | | | |
| S107-55 | | | | | | |
| VORANOL C 3090 | 63.64 | 67.53 | 63.64 | 63.64 | 63.64 | 63.64 |
| M-PEG | | | | | | |
| DMPA | 4.0 | 3.0 | 4.0 | 4.0 | 4.0 | 4.0 |
| 1,4-BDO | | | | | | |
| CHDM | 4.39 | 3.96 | 3.67 | 3.67 | 3.67 | 3.67 |
| AMEO | 1.21 | 1.21 | 3.43 | 3.43 | 3.43 | 3.43 |
| DBTDL | 0.02 | 0.02 | 0.02 | 0.02 | 0.02 | 0.02 |
| HH | | | | | 1.13 | 0.56 |
| CDH | 1.52 | 1.38 | 1.52 | 2.03 | | |
| IRGANOX 1010 | 0.5 | 0.5 | | | | |
| TINUVIN 292 | 0.5 | 0.5 | | | | |
| ED | 0.34 | 0.31 | 0.34 | | | 0.68 |
| TEA | 3.02 | 2.26 | 3.02 | 3.02 | 3.02 | 3.02 |
| MEK/Acetone | 20/60 | 20/60 | 20/60 | 20/60 | 20/60 | 20/60 |
| DI Water | 206 | 206 | 208 | 206 | 207 | 207 |
| Final Solid (wt %) | 35% | 35% | 35% | 35% | 35% | 35% |

Examples 11-13

A 1 L three-necked round bottom flask equipped with a mechanical stirrer and argon inlet was charged with 158.31 g VORANOL 220-094 and 106.25 g H12MDI. The polyaddition reaction was carried out under stirring at 78° C. in the presence of DBTDL of about 0.03 g. After 1 h reaction, 12.47 g DMPA and 70.6 g MEK was added. Then the reaction was carried out at 85° C. for about 3 h until DMPA was dissolved to form a homogenous solution. After 3 h reaction, the chains were extended by adding 2.38 g of 1,4-BDO, and allowed to react for 2.0 h to form polyurethanes prepolymer, which was then cooled to about 25° C. 2.80 g Irganox 245 and 117.6 g of ethyl acetate were weighed in and mixed for 30 minutes. The resulting prepolymer was then neutralized by the addition of TEA (9.90 g) under stirring for 30 min, and then partially terminated by the addition of 7.06 g AMEO and mixed for another 30 min.

A 2 L three-necked round bottom flask equipped with a mechanical stirrer and argon inlet was charged with 610 of water. While stirring the water at 1,000 rpm, added 480.1 g of the prepolymer over about 30 min through an addition funnel (ambient temp).

A 500 mL three-necked round bottom flask equipped with a mechanical stirrer and argon inlet was charged with 200 g of the prepolymer dispersion. While stirring the prepolymer solution at 300 rpm, a dihydrazide chain extender was added.

For Example 11, 2.46 grams of oxalic dihydrizide was utilized.

For Example 12, 3.05 grams of succinic dihydrizide was utilized.

For Example 13, 3.63 grams of adipic dihydrizide was utilized.

After the dihydrazide chain extender was added, the dispersion was heated to 50° C. while continuing to stir at 300 rpm. The dispersion was held for 1 h at 50° C. then cooled to ambient temperature. The organic solvents were removed using a rotary evaporator. The final percent solids of the dispersions were 30-40%.

TABLE 2

| Test Results | | | | | |
|---|---|---|---|---|---|
| | C-1 | C-2 | EX-3 | EX-4 | EX-5 |
| Thermal aging ΔE after 12 days | 9.78 | 1.1 | 0.81 | 1.25 | 0.94 |
| Thermal aging ΔE after 16 days | 10.50 | 1.36 | 0.90 | 1.89 | 1.25 |
| Water resistance color change ΔE | 3.52 | 19.1 | 1.1 | 0.5 | 2.32 |

| | EX-6 | EX-7 | EX-8 | EX-9 | EX-10 |
|---|---|---|---|---|---|
| Thermal aging ΔE after 12 days | 0.94 | 0.64 | 0.73 | 0.82 | 0.76 |
| Thermal aging ΔE after 16 days | 1.09 | 0.79 | 0.77 | 0.79 | 0.84 |
| Water resistance color change ΔE | 9.0 | 44.0 | 7.1 | 40.1 | dissolved |

Example 3-10 exhibit improved thermal aging relative to C-1. Examples 3-5 exhibit improved water resistance relative to C-1 and C-2.

What is claimed is:

1. A method of making a silyl-terminated polyurethane in an aqueous dispersion comprising the steps of
   (a) preparing an isocyanate terminated polyurethane prepolymer by reacting a mixture comprising:
      (i) a polyol component comprising a diol; and
      (ii) a polyisocyanate component comprising a diisocyanate; and
   (b) reacting the isocyanate terminated polyurethane prepolymer prepared according to (a) sequentially with
      (iii) an anionic water solubilizing compound;
      (iv) a compound to neutralize the anionic water solubilizing compound;
      (v) an alkoxy silane compound having the formula $(R^3O)_3SiR^4$—Z, wherein 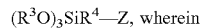

$R^3$ is independently hydrogen or a $C_1$-$C_4$ alkyl
      $R^4$ is a divalent group selected from alkylene, alkylarylene, oxyalkylene; and
      Z is selected from the group consisting of —OH, —SH, —NHR, —NH$_2$, wherein R is an aromatic or cyclic aliphatic group;
      (vi) a difunctional hydrazide or hydrazine compound; and
      (vii) an amine chain extender; and
   (c) dispersing the resulting silyl-terminated polyurethane in water.

2. The method of claim 1 wherein the silyl-terminated polyurethane comprises no greater than 1 wt-% of ethylene oxide units.

3. The method of claim 1 wherein further comprising reacting the isocyanate terminated polyurethane with a polyol chain extender after reacting with iii) and prior to reacting with iv).

4. The method of claim 3 wherein the polyol chain extender is a cyclic aliphatic diol.

5. The method of claim 1 wherein the anionic water solubilizing compound has the formula (HB)$_2$R$^1$A wherein
B is selected from the group consisting of O, S, NH or NR, wherein R is an alkyl group comprising 1 to 4 carbon atoms;
R$^1$ represents an organic linking group; and
A is an anionic group selected from —CO$_2$M, —OSO$_3$M, —SO$_3$M, —OPO(OM)$_2$ and —PO(OM)$_2$, wherein M is H or a water soluble cation.

6. The method of claim 1 wherein the hydrazine or hydrazide compound is selected from carbodihydrazide, thiocarbohydrazide, or a dihydrazides having the following formula:

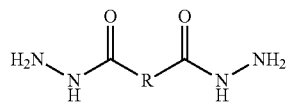

where R is a covalent bond, a heteratom, or a divalent organic radical.

7. The method of claim 1 wherein the diisocyanate comprises cycloaliphatic moieties.

8. The method of claim 1 wherein the compound to neutralize the anionic water solubilizing compound is an alkyl amine.

9. The method of claim 1 wherein the silyl-terminated polyurethane comprises about 15 to 50 wt-% cyclic aliphatic moieties based on the weight of the silyl-terminated polyurethane.

10. The method of claim 1 wherein the silyl-terminated polyurethane comprises silicon in an amount ranging from 0.015 to 1.5 wt-% based on the weight of the silyl-terminated polyurethane.

11. The method of claim 1 wherein the silyl-terminated polyurethane comprises hydrazine or hydrazide moieties in an amount ranging from 0.1 to 5 wt-% based on the weight of the silyl-terminated polyurethane.

* * * * *

UNITED STATES PATENT AND TRADEMARK OFFICE
CERTIFICATE OF CORRECTION

PATENT NO. : 10,351,653 B2
APPLICATION NO. : 15/127563
DATED : July 16, 2019
INVENTOR(S) : Lu et al.

It is certified that error appears in the above-identified patent and that said Letters Patent is hereby corrected as shown below:

In the Specification

Column 3,
Line 50, delete "trimethlyolpropane." and insert -- trimethylolpropane. --, therefor.

Column 5,
Line 31, delete "cyclohexy," and insert -- cyclohexyl, --, therefor.
Line 34, delete "diisocyanante(s)" and insert -- diisocyanate(s) --, therefor.
Line 39, delete "diisocyanante(s)." and insert -- diisocyanate(s). --, therefor.
Line 40, delete "diisocyanante)" and insert -- diisocyanate) --, therefor.

Column 7,
Line 10, delete "oxyalklyene," and insert -- oxyalkylene, --, therefor.
Line 12, delete "oxyalklyene" and insert -- oxyalkylene --, therefor.
Lines 17 & 18, delete "-methyidiethoxysilane;" and insert -- -methyldiethoxysilane; --, therefor.
Line 61, delete "heteratom" and insert -- heteroatom --, therefor.

Column 9,
Line 42, delete "Rotoevaporator" and insert -- Rotary Evaporator --, therefor.

Columns 11 & 12,
Line 39, delete "trimethylcylcohexyl" and insert -- trimethylcyclohexyl --, therefor.

Column 15,
Line 47, delete "polyurathane" and insert -- polyurethane --, therefor.

In the Claims

Column 20,
Line 1, in Claim 6, delete "heteratom," and insert -- heteroatom, --, therefor.

Signed and Sealed this
Seventeenth Day of September, 2019

Andrei Iancu
*Director of the United States Patent and Trademark Office*